(12) United States Patent
Prevey (10) Patent No.: US 7,188,398 B2
(45) Date of Patent: Mar. 13, 2007

(54) METHOD FOR IMPROVING THE MAGNITUDE OF COMPRESSIVE STRESS DEVELOPED IN THE SURFACE OF A PART

(75) Inventor: Paul S. Prevey, Cincinnati, OH (US)

(73) Assignee: Surface Technology Holdings, Ltd., Cincinnati, OH (US)

( * ) Notice: Subject to any disclaimer, the term of this patent is extended or adjusted under 35 U.S.C. 154(b) by 185 days.

(21) Appl. No.: 10/759,954

(22) Filed: Jan. 17, 2004

(65) Prior Publication Data

US 2005/0155203 A1     Jul. 21, 2005

(51) Int. Cl.
    *B24B 39/00*     (2006.01)
(52) U.S. Cl. .................................. 29/90.5; 29/90.01
(58) Field of Classification Search .............. 29/90.01, 29/90.2, 90.3, 90.5; 428/615
    See application file for complete search history.

(56) References Cited

U.S. PATENT DOCUMENTS 6,415,486 B1 * 7/2002 Prevey, III ............... 29/90.01

6,926,970 B2 * 8/2005 James et al. ............. 428/615

FOREIGN PATENT DOCUMENTS

SU          701777      * 12/1979

\* cited by examiner

*Primary Examiner*—John C. Hong
(74) *Attorney, Agent, or Firm*—Mark F. Smith; Smith Brandenburg Ltd.; Brian A. Tent (57) ABSTRACT

This invention relates to a method and an apparatus for performing the method of inducing compressive residual stress along the surface of a part. In the preferred embodiment of the invention, the method includes burnishing or deep rolling a surface using a first and a second roller or ball burnishing members, whereby the first and second burnishing members may have a different diameter and/or modulus of elasticity. In another preferred embodiment of the invention, the burnishing operations may be performed while the surface of the part is at different temperatures.

6 Claims, 10 Drawing Sheets

Subsurface residual stress distribution produced by a single-pass burnishing operation compared to the distribution produced by a multi-pass burnishing operation.

FIG. 7

Subsurface residual stress distributions produced by a single pass and a second pass burnishing operation using a higher elastic modulus ball.

FIG. 8

Depth of compression achieved with increasing load in spherical ball burnishing using a 0.75 in. ball at room and elevated temperature of 400° F.

FIG. 9

Surface tensile stress developed by cooling the surface plotted as a function of the temperature differential achieved between the surface and interior.

FIG. 10

METHOD FOR IMPROVING THE MAGNITUDE OF COMPRESSIVE STRESS DEVELOPED IN THE SURFACE OF A PART

BACKGROUND OF THE INVENTION

This invention relates to a method and an apparatus for performing the method of inducing compressive residual stress along the surface of a part and, more particularly, to a method and an apparatus for performing the method of burnishing or deep rolling a surface of a part whereby the magnitude and penetration of compressive residual stress achieved is greater than that achieved by conventional burnishing.

Surface residual stresses are known to have a major affect upon the fatigue and stress corrosion performance of components or parts in service. Tensile residual stresses that can be developed during manufacturing processes, such as grinding, turning, or welding are well known to reduce both fatigue life and increase sensitivity to corrosion-fatigue and stress corrosion cracking in a wide variety of materials. It is also known that compressive residual stresses induced in the surface of a part can increase its fatigue life and reduce its susceptibility to corrosion-fatigue and stress corrosion cracking. However, the benefit of inducing a layer of surface compression in reducing susceptibility to stress corrosion, cracking, fatigue, and corrosion-fatigue is lost if the layer of compression relaxes with time in service.

Many components and parts of practical interest are subject to high tensile cyclic loads or high mean loads that often lead to fatigue, corrosion fatigue, stress corrosion, or a combination of such failure modes. Therefore, it would be desirable to be able to introduce a layer of compressive residual stress along the surface of a part that will not relax significantly over time.

A method that has been developed and is widely used in industry to improve surface finish as well as fatigue life and corrosion resistance of a part by inducing a layer of compressive residual stress along its surface of the part is known as burnishing. During the burnishing process, the surface of a part is deformed by a rotary or sliding burnishing member that is pressed against the part in order to compress the microscopic peaks formed along the surface of the part into adjacent hollows. Burnishing thereby operates to develop compressive stresses by yielding the surface of the part in tension so that it returns to a state of compression following deformation. Burnishing tools comprising various wheel or roller burnishing member configurations have been developed for cold working a part and to induce a state of compressive stress and improved surface finish to the part. In addition, "deep rolling" and "low plasticity burnishing" processes have also been developed for producing deep layers of compressive stress that approach the yield strength of the material and which extend to over a millimeter into the surface. However, the deformation mechanism for producing such compressive stresses is based on hertzian loading and will generally produce maximum compression below the surface of the part. In many high strength or work hardening materials, the stresses produced along the upper surface by these burnishing methods can be far less than the subsurface maximum, often being close to or having zero compression at the upper surface. Processes have therefore been developed to increase the stress levels at the upper surface of a part. Such processes include removing a thin layer of material from the surface of the part, such as by etching, electropolishing, or some other non-tensile stress forming process; or a post treatment, such as shot peening, grit blasting, or similar compression producing treatments, to render the surface more highly compressive. Unfortunately, both approaches require a secondary surface treatment unrelated to the original burnishing process thereby adding time, cost, and the potential for damage and the loss of the part during manufacture.

With respect to shot peening operations, secondary peening operations have been used to improve surface compression. For example, to increase the state of surface compression in a part, secondary peening operations have been performed using small glass or ceramic shot following conventional steel shot peening with larger shot. Shot peening while being relatively inexpensive and preferred for many applications, is often unable to obtain the necessary coverage of the part without overlaping areas of impingement. Such overlapping often results in relatively large amount of cold working which may leave the surface compressive layer susceptible to stress relaxation. Further, shot peening is often unacceptable for use in manufacturing parts requiring a superior finish, localized or relatively complex compressive stress zones or patterns, or requiring a greater depth of compressive stress penetration.

Consequently, it would be desirable to have a relatively inexpensive and time efficient method and apparatus for implementing the method of improving the physical properties of a part by increasing the magnitude and penetration of compressive stress on the surface that would not significantly relax over time. It would also be desirable to have a method and an apparatus that would be effective for use with complex shaped surfaces and without detracting from the finish of the surface, and which could be performed relatively inexpensively and in a single pass.

SUMMARY OF THE INVENTION

The novel method of the present invention for inducing compressive stress on the surface of a part comprises the steps of selecting at least one region along the surface of the part for inducing compressive surface stresses; performing a first operation to induce compressive surface stresses along the selected region of the part; and performing a second operation to induce a second layer of compressive surface stresses along the selected region of the part.

In another preferred embodiment of the invention the compressive surface stresses are induced into the selected region of the part by exerting compressive forces against the surface such that during the first operation the compressive force is greater than the compressive force exerted during the second operation.

In another preferred embodiment of the invention the first operation and the second operation of inducing compressive residual stresses along the surface of the part are burnishing operations.

In another preferred embodiment of the invention the burnishing operations are performed using a compression inducing means having a first burnishing member and a second burnishing member whereby the first burnishing member has a different modulus of elasticity than the second burnishing member.

In another preferred embodiment of the invention, the diameter of the first burnishing member is smaller than the diameter of the second burnishing member.

In another preferred embodiment of the invention the diameter of the first burnishing member is larger than the diameter of the second burnishing member.

In another preferred embodiment of the invention, the method induces at least one layer of compressive residual stress along the selected region such that the amount of cold working of less than about 5%.

In another preferred embodiment of the invention, the method induces at least one layer of compressive residual stress along the selected region such that the amount of cold working of less than about 2%.

In another preferred embodiment of the invention, the second operation is performed as an independent secondary operation.

In another preferred embodiment of the invention, the first and the second operations are performed together in a single pass.

In another preferred embodiment of the invention, the first operation is performed while the selected region of the part is at a first temperature and the second operation is performed while the selected region of the part being burnished is at a second temperature.

Another preferred embodiment of the invention, an apparatus for inducing compressive residual stress in the surface of a part comprises a first compression inducing means having a burnishing member and a second compression inducing means having a burnishing member, wherein the burnishing member of the first compression inducing means has a diameter that is greater than or less than the diameter of the burnishing member of the second compression inducing means.

In another preferred embodiment of the invention, the apparatus for inducing compressive residual stress in the surface of a part comprises a plurality of burnishing members having consecutively small diameters.

In another preferred embodiment of the invention, the first compression inducing means is fixed in a first positioning device and the second compression inducing means is fixed in a second positioning device.

In another preferred embodiment of the invention, the first compression inducing means and the second compression inducing means are fixed in a single positioning device.

In another preferred embodiment of the invention, the modulus of elasticity of the burnishing member of the first compression inducing means is different than the modulus of elasticity of the burnishing member of the second compression inducing means.

Various objects and advantages of the invention will be apparent from the following description, the accompanying drawings, and the appended claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

The present invention relates to a method and apparatus for performing the method of inducing compressive residual stress along a selected region of a part. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

It has been found that the effect of secondary burnishing or deep rolling either parallel or perpendicular to the original path of the burnishing apparatus using the same burnishing member diameter and compressive loads have shown to have no significant effect on the residual stress developed. In order to facilitate the introduction of greater compressive residual stresses in a part, deep rolling and other conventional burnishing techniques have been developed that utilize multiple passes of the burnishing member over the surface of the part, often with an increasing load, to induce compressive residual stresses within the surface. For parts where it is desirable to minimize cold working of the surface, low plasticity burnishing have been developed that performs the burnishing operation in a single pass and exhibits the same compressive residual stresses as observed in conventional multi-pass burnishing.

It has now been unexpectedly found that if a smaller ball or roller diameter is used over the surface of a previously burnished part, that a much higher state of compressive stress can be generated on the upper surface of the part, eliminating the problem of low surface compression. This process can be performed in stages with a single apparatus or using a series of burnishing apparatus having different size burnishing members, such as balls or rollers, whereby the burnishing members pass over the surface consecutively during a single pass or in multiple passes over the part.

Figure 1:
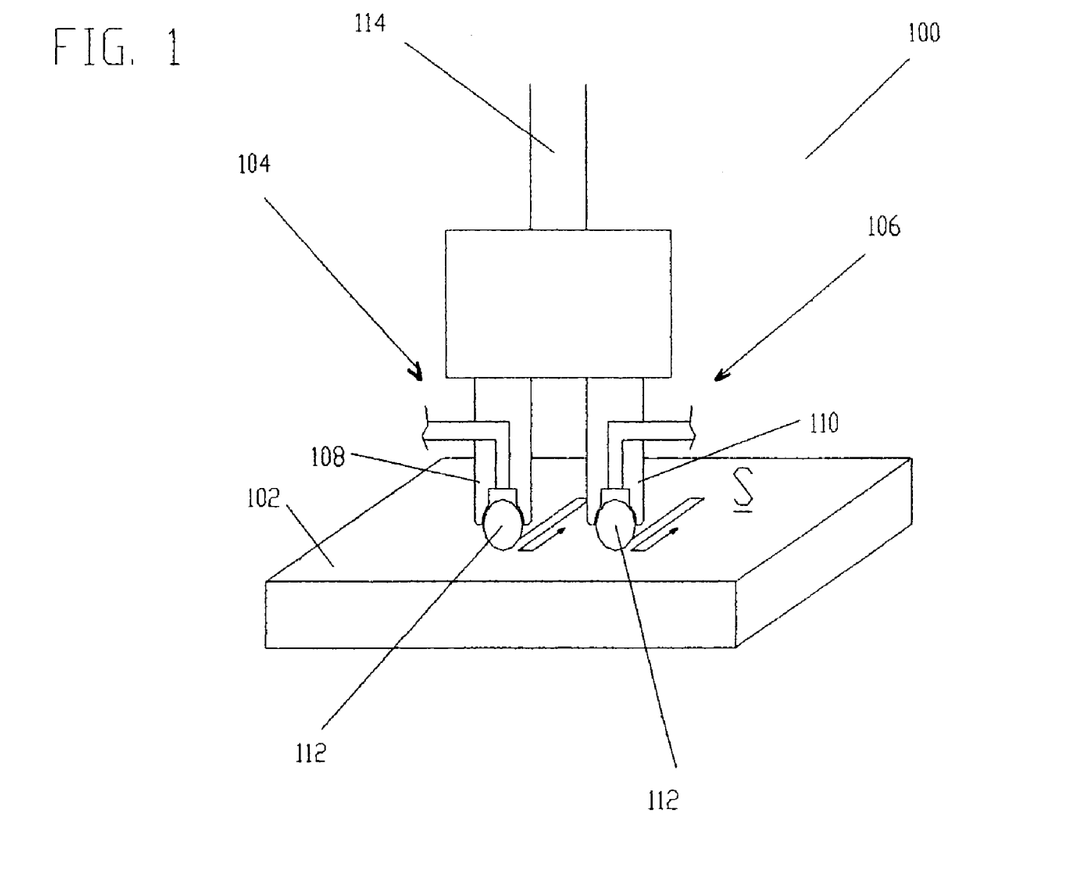
FIG. 1 is a schematic representation of a preferred embodiment of the apparatus of the present invention for inducing a layer of compressive residual stress in the surface of a part in which the means for inducing compression are fixed in a single positioning device effective for linear motion.
Figure 2:
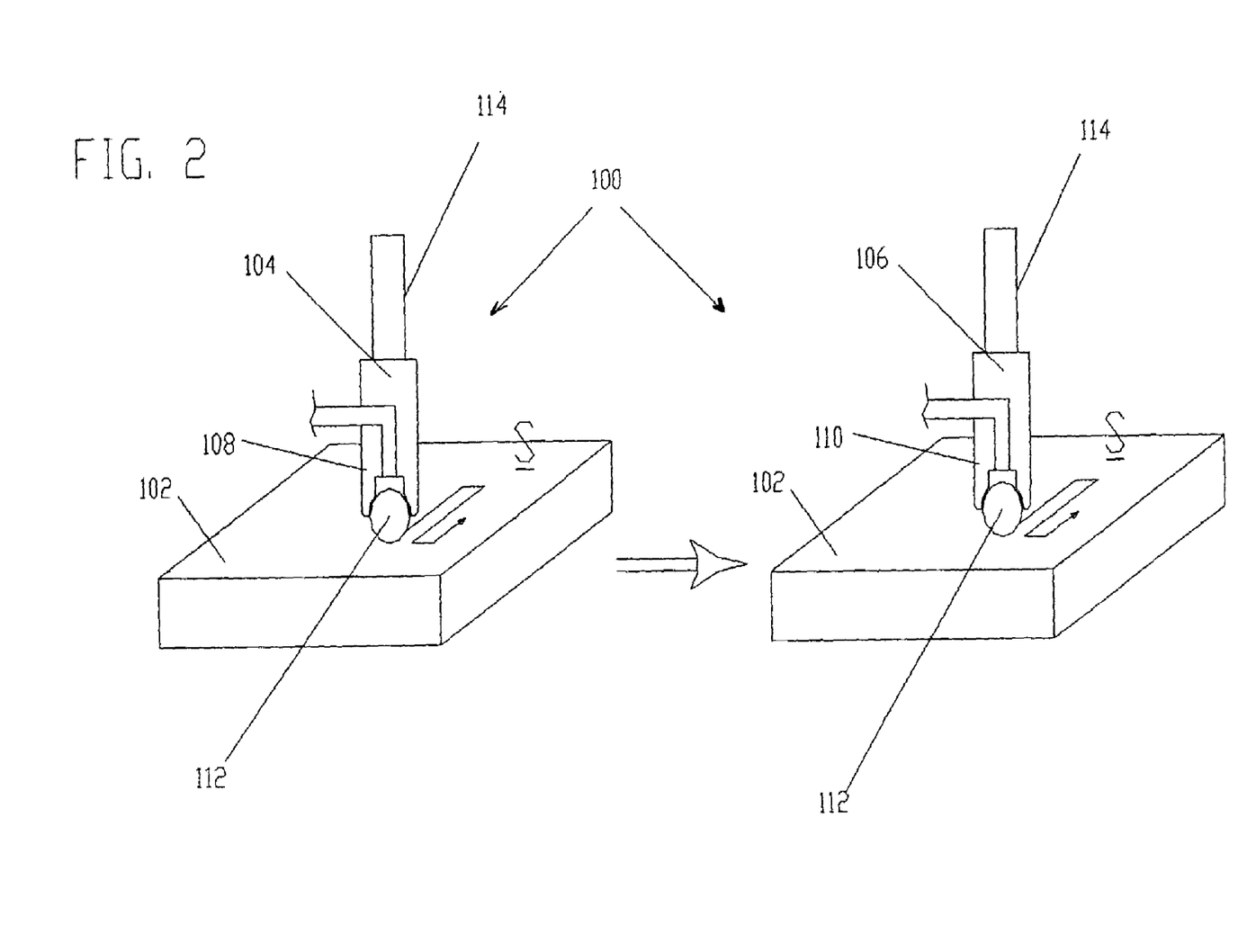
FIG. 2 is a schematic representation of the preferred embodiment of the apparatus of FIG. 1 in which the means for inducing compression are fixed in separate positioning devices.
Figure 3:
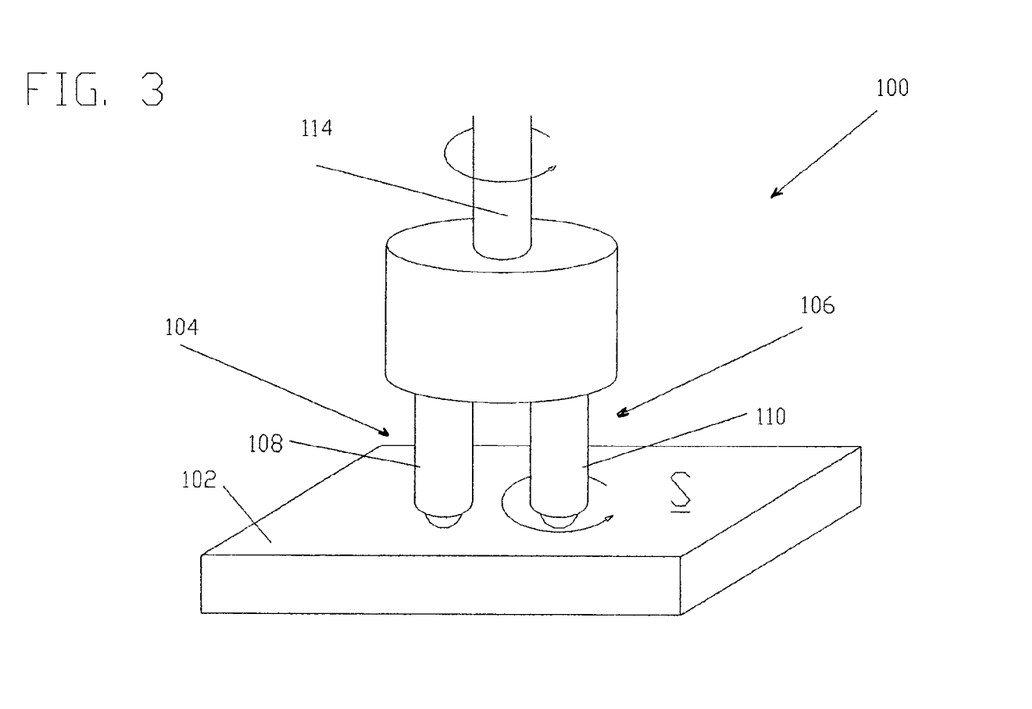
FIG. 3 is a schematic representation of another preferred embodiment of the apparatus of the present invention for inducing a layer of compressive residual stress in the surface of a part in which the means for inducing compression are fixed in a single positioning device effective for both linear and rotational movement.
Figure 4:
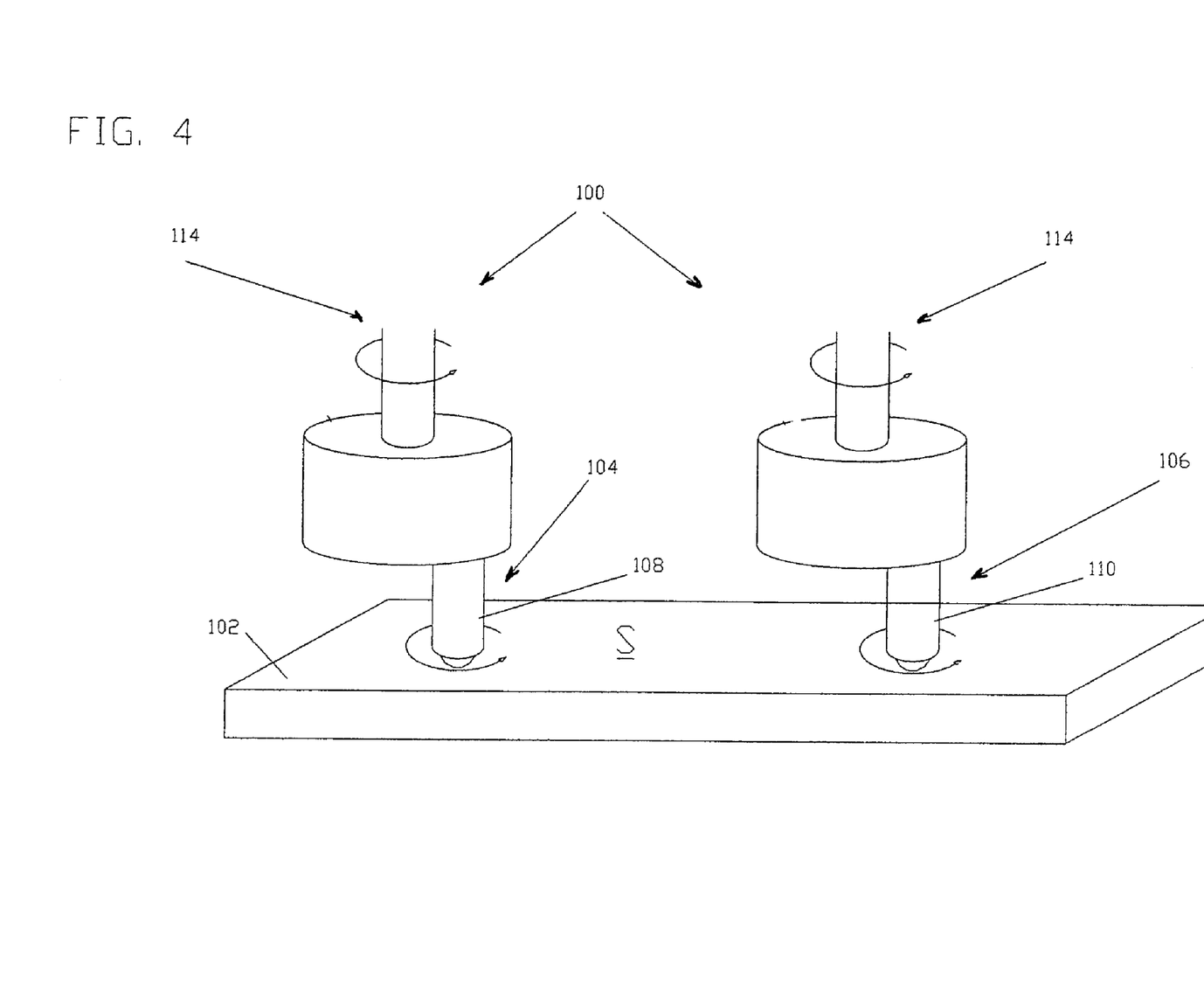
FIG. 4 is a schematic representation of the preferred embodiment of the apparatus of FIG. 3 in which the means for inducing compression are fixed in separate positioning devices.

Referring to FIGS. 1 through 4, there is illustrated an apparatus 100 for inducing a residual compressive stress in the surface S of a part 102. According to one embodiment of the present invention, the apparatus 100 for inducing compressive residual stress along the surface S of a selected region of a part includes a first compression inducing means 104 and a second compression inducing means 106. While various compression tools have been developed for inducing a layer of residual compressive stress in the surface of a part, preferably, the first compression inducing means 104 and the second compression inducing means 106 preferably comprise conventional burnishing members 108 and 110, respectively. Various types of burnishing tools have also been developed, preferably the compression inducing means 104, 106 are single-point burnishing members, such as described in U.S. Pat. No. 5,826,453 entitled "Burnishing Method and Apparatus for Providing a Layer of Compressive Residual Stress in the Surface of a Workpiece," which is assigned to an assignee of the present invention and is incorporated herein by reference. As illustrated, in a preferred embodiment of the invention, the compression inducing means 104 and 106 each include a burnishing ball 112, the forward most tip of which is caused to pass over the surface S of the part 102 in a rolling motion to induce deep compression. As schematically illustrated in FIGS. 1 and 3, the compression inducing means 104 and 106 are preferably mounted to a conventional single positioning device 114, such as a robotic arm or milling machine (not shown). As schematically illustrated in FIGS. 2 and 4, the compression inducing means 104 and 106 are preferably mounted to conventional separate positioning devices 114. Further, the burnishing members 108 and 110 may be mounted to a positioning device(s) 114 effective for linear motion, as shown in FIGS. 1 and 2, or to a positioning device(s) 114 effective for both linear and rotational motion, as shown in FIGS. 3 and 4.

The direction of motion and speed of the apparatus 100 and the first and second inducing means 104 and 106 will depend upon the material forming the part 102 and the final application of the part, as well as the desired penetration of the residual compressive stress induced therein. The force applied by the compression inducing means 104 and 106 to the surface S of the part 102 will also depend on the desired penetration of residual compressive strength, material composition, material properties, and dimensions of the part 102, and the application of the final part.

Figure 5:
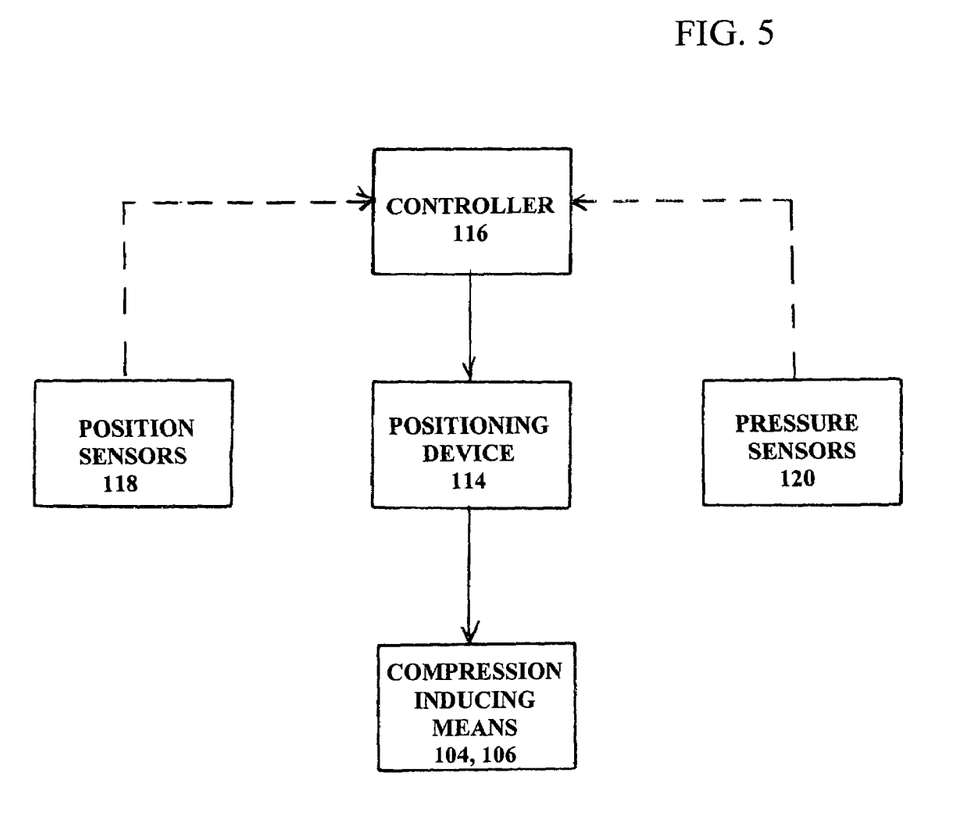
FIG. 5 is a schematic representation of the apparatus of FIGS. 1 through 4 showing the relationships of the various components.

The apparatus 100 of the present invention can be manually or automatically operated. Referring to FIG. 1 and as schematically illustrated in FIG. 5, the apparatus 100 can include a controller 116 for automatically controlling the positioning device 114 and, thus, the direction of motion and speed of the compression inducing means 104 and 106. The controller 116 also can be used to control the force applied by the compression inducing means 104 and 106 to the surface S of the part 102. The controller 116 can include a microprocessor, such as a computer operating under computer software control. In one embodiment, the positioning device 114 includes belt and/or gear drive assemblies (not shown) powered by servomotors (not shown), as is known in the art. The controller 116 can be in operable communication with the servomotors of the positioning device 114 through suitable wiring (not shown).

One or more sensors 118, including, but not limited to, linear variable differential transformers or laser, capacitive, inductive, or ultrasonic displacement sensors, which are in electrical communication with the controller 116 through suitable wiring, can be used to measure the spacing of the compression inducing means 104 and 106 above the surface S of the part 102, and, thus, the motion of the compression inducing means 104 and 106. Similarly, shaft encoders in servo systems, stepper motor drives, linear variable differential transformers, or resistive or optical positioning sensors can be used to determine the position of each compression inducing means 104 and 106 along the surface S of the part 102. One or more pressure sensors 120 including, but not limited to, load cells incorporating resistive, piezoelectric, or capacitive elements, which are in electrical communication with the controller 116 through suitable wiring, can be used to measure the amount of force applied by each of the compression inducing means 104 and 106 to the surface S of the part 102. For example, pressure transducers can be used to monitor the hydraulic pressure applied by a piston to determine the normal force on the compression inducing means 104 and 106. The measurements obtained by the motion and pressure sensors are communicated to the controller 116. The controller 116 compares the measurements to preprogrammed parameters and, if necessary, instructs the servomotors (not shown) of the positioning device 114 to make corrections or adjustments to the direction of motion, speed of motion, and/or force being applied by the compression inducing means 104 and 106.

When inducing compressive residual stress along a selected region on the surface S of a part, the part 102 is preferably secured to a work table (not shown) by means of a clamp or similar device (not shown). The apparatus 100 is positioned relative to the part 102 such that the compression inducing means 104 and 106 are positioned adjacent to the surface S of the part 102. The first compression inducing means 104 is engaged and moved along the surface of a part 102 to induce a first layer of compression within the surface S. According to another embodiment (not shown), the first compression inducing means 104 is fixed and the part 102 is moved relative to the compression inducing means 104. Thereafter, the second compression inducing means 106 is engaged and moved along the surface S of the part 102 to induce residual compressive stress along the upper surface of the part 102. According to another embodiment (not shown), the second compression inducing means 104 is fixed and the part 102 is moved relative to the second compression inducing means 104. It should now be apparent that as shown in FIGS. 1 and 3, the first compression inducing means 104 and the second compression inducing means 106 can be fixed in a single positioning device 114 or can be fixed in separate positioning devices 114 as shown in FIGS. 2 and 4.

As discussed above, the first and the second compression inducing means 104 and 106 operate by forcing the burnishing member 110 against the surface S of the part 102 to produce the zones of deformation and to induce both residual compressive stresses deep within the surface as well as along the upper surface of part 102. As previously described, in a preferred embodiment, the first compression inducing means 104 and the second compression inducing means 106 are attached to a shared positioning device 114 (FIGS. 1 and 3). As illustrated, the orientation and positioning of the first and the second compression inducing means 104, 106 are such that the second compression means 106 follows the same path of the first compression inducing means 104 thereby imparting additional compressive residual stresses within the surface S of the part 102. In another preferred embodiment, the first compression inducing means 104 and the second compression inducing means 106 are attached to separate positioning devices 114 (FIGS. 2 and 4). In this way, the second compression inducing means 106 may follow the same path of the first compression inducing means 104 or may follow a different path and may therefore impart a more complex pattern of residual stresses within the surface S of the part 102.

According to another embodiment of the present invention, conventional X-ray diffraction techniques are used to analyze the surface S of the part 102 to determine a selected region, the desired compressive stress pattern, penetration depth, as well as the amount of cold working and surface hardening necessary to optimize the material properties of the part 102. The burnishing member 112 of each compression inducing means 104 and 106 can then be passed in a predetermined pattern with a constant or varying pressure, manually or using the controller 116, across the surface S of the part 102 to induce the desired pattern of residual compressive stresses within the surface S.

Figure 6:
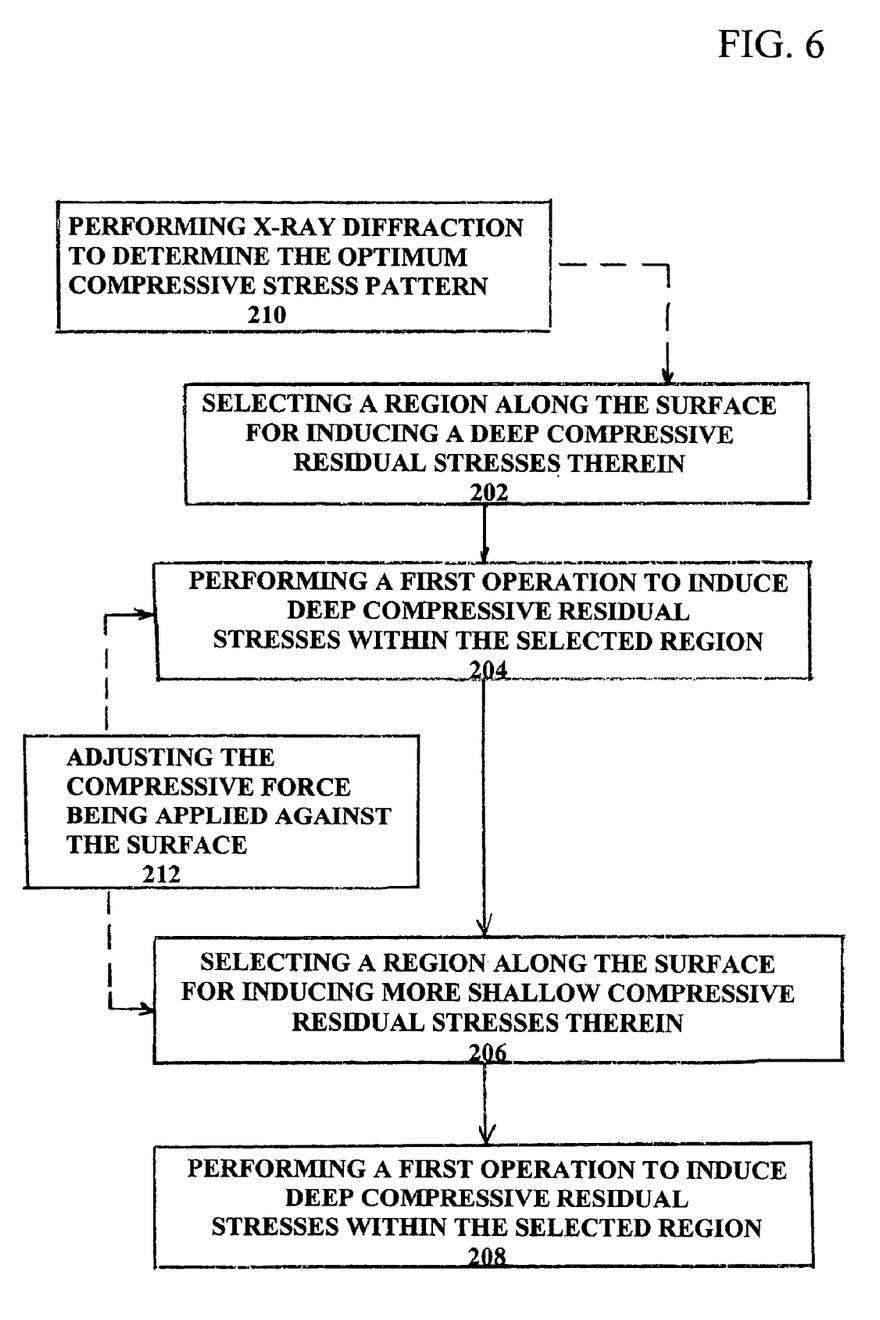
FIG. 6 is a flowchart illustrating a preferred embodiment of the method of the present invention for inducing a layer of compressive residual stress in the surface of a part.

Referring to FIG. 6, there is illustrated the method of inducing a layer of compression along the surface of a part, according to one embodiment of the present invention. The method includes the steps of selecting at least one region of the surface of a part for inducing a deep layer of compressive residual stress therein, step 202, and performing a first operation to induce a selected pattern of residual compressive stress within the region of the surface of the part, step 204. The method further includes selecting the same region and/or another region(s) for inducing a more shallow layer of compressive stresses, step 206, and performing a second operation to induce a second more shallow layer of compressive surface stresses along the selected region(s), step 208. In a preferred embodiment of the invention, the method includes controlling the amount of cold working and surface hardening in the portion of the surface of the part. For example, in one embodiment, the desirable amount of cold working may be less than about five percent (5%) or less than about two percent (2%). In another embodiment, the method of inducing the layer of compressive residual stress is by burnishing. In another embodiment, the first and second operations are performed such that the means for inducing compression across the surface of a part are moved in a predetermined pattern and pressure to induce zones of residual compressive stress that do not substantially overlap. In another embodiment, the method includes performing X-ray diffraction to determine the optimum compressive stress pattern to be induced within the surface of the part, step 210. In another embodiment, the first and the second operations are performed such that the direction of motion and/or the speed of motion of the means of inducing compression across the surface of the part are controlled. In yet another embodiment, the method includes adjusting the force being applied by the means of inducing compression against the surface of the part, step 212.

The method of burnishing applied in a single-pass or in multiple passes can be effective for producing compressive residual stresses following tensile deformation of the part along the upper surface of the part and to a certain depth within the surface of the part and produces deep compression with minimal cold working. It has been found that single-point burnishing can be used to produce a part with less cold work and surface hardening than a part subjected to conventional burnishing operations. It has also been found that the layer of residual compressive stress developed, according to the present invention, penetrates to a greater depth than that developed by conventional burnishing. The amount of cold working and surface hardening also can be varied as part of the process to optimize the material properties of the part. The optimal amount of cold working and surface hardening will depend on the particular material of the part and the environment which the part will be subjected to during its life. It has been found, however, that by cold working the surface of the part by less than about five percent (5%) and, more preferably, by less than about two percent (2%), results in a part having longer retention of residual compressive stress at elevated temperature, less rapid relaxation under cyclic loading, and less alteration of the residual stress field during tensile or compressive overload than parts formed using conventional cold working and surface hardening processes.

Figure 7:
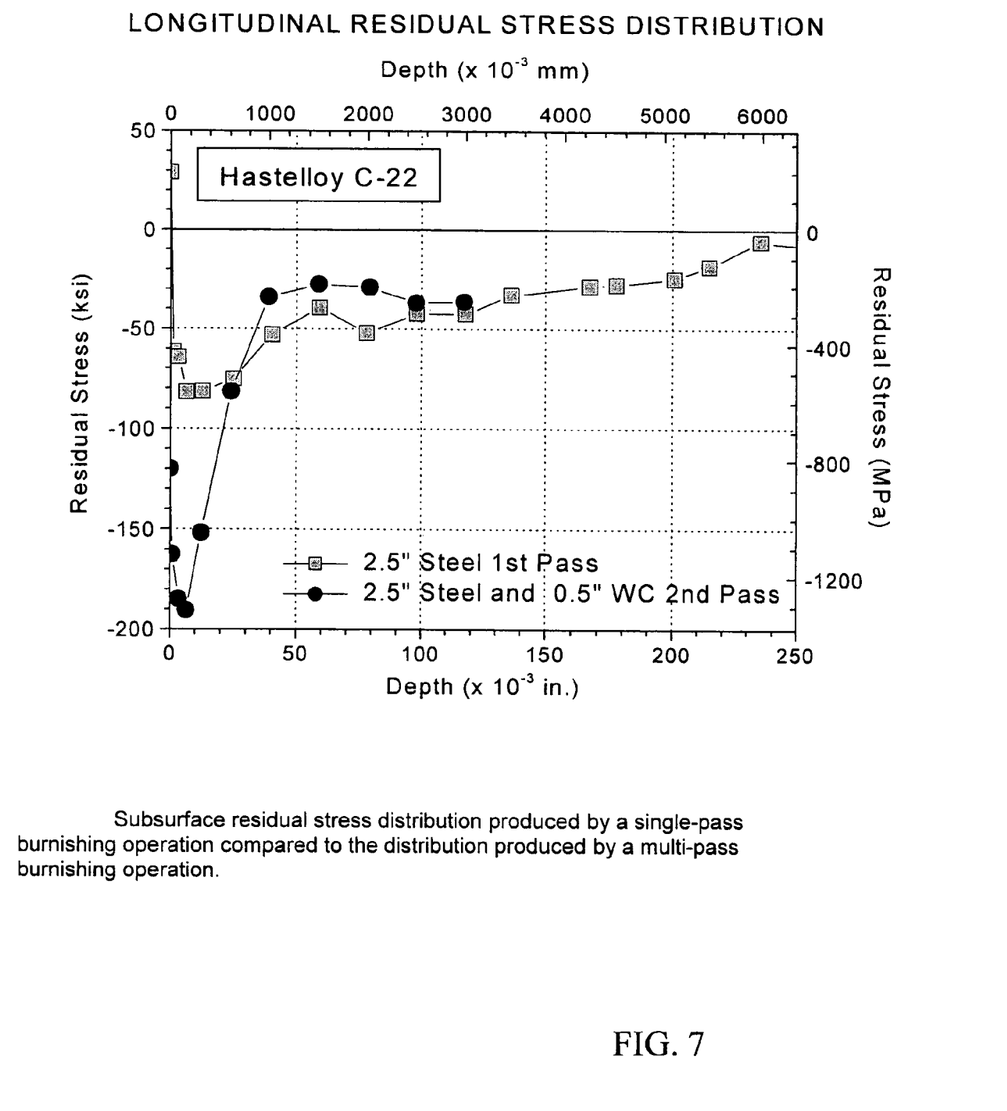
FIG. 7 is a graphical illustration of the subsurface residual stress distributions produced by the method of the present invention whereby a first operation was a burnishing operation performed using a 2.5 in. (6.35 cm) diameter ball and a second operation was a burnishing operation performed using a 0.25 in. (0.64 cm) diameter ball to achieve compression of about 0.3 in (0.8 cm) into the surface of the part.

Referring to FIG. 7, a graphical representation illustrating the subsurface residual stress distributions produced by the method of the present invention is shown whereby the first operation for inducing compressive residual stress in the surface of the part was performed using a 2.5 in. (6.35 cm) diameter ball burnishing member and the second operation was performed using a 0.25 in. (0.64 cm) diameter ball burnishing member to achieve compression of about 0.31 in. (0.8 cm) into the surface of the part. The upper graph shows the residual stress distributions as functions of depth and shows the increased compression achieved to a depth of less than about one millimeter due to the use of the second pass burnishing operation.

Figure 8:
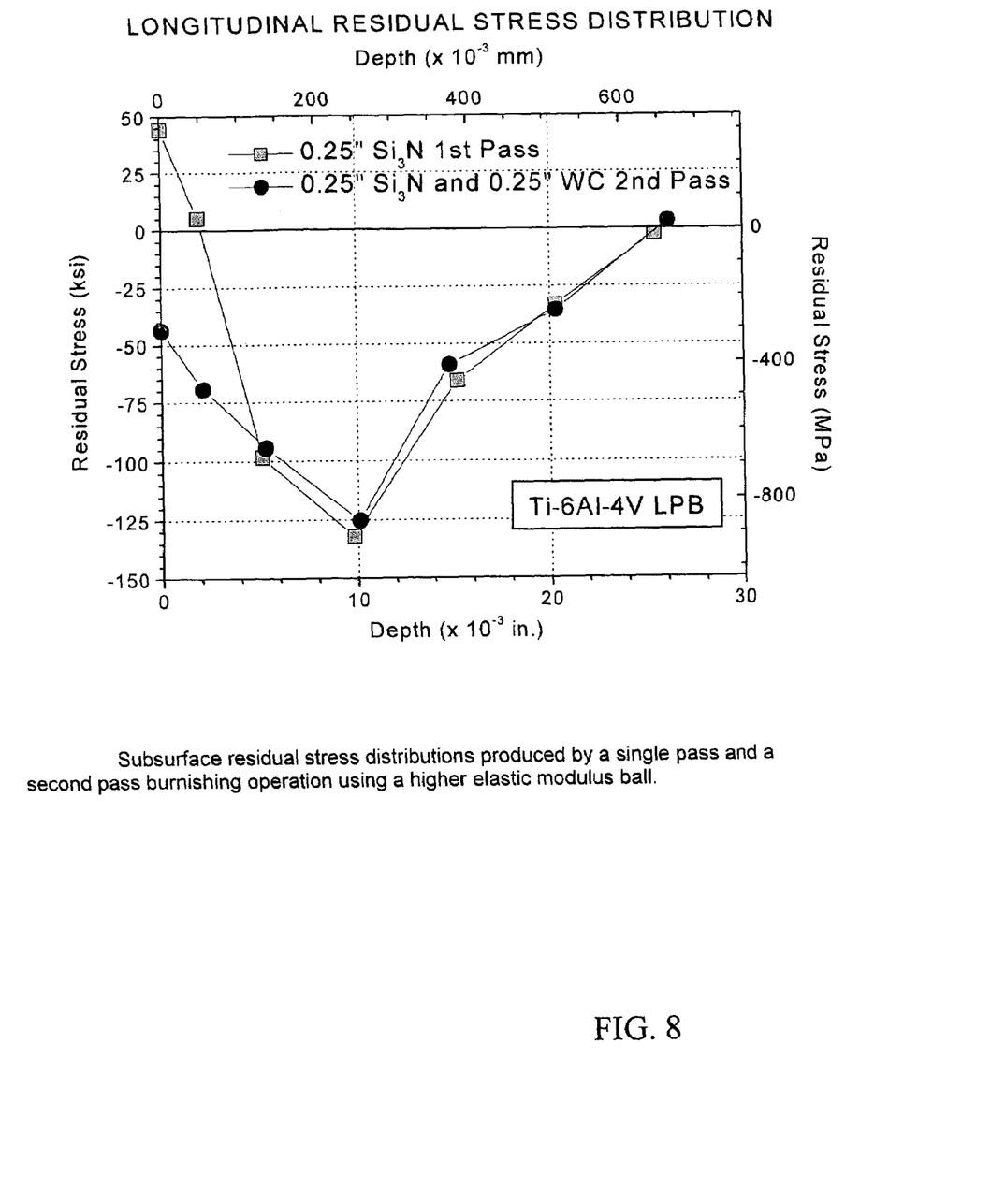
FIG. 8 is a graphical illustration of the subsurface residual stress distributions produced by the method of the present invention whereby the modulus of elasticity of the burnishing member used in the second operation is higher than the modulus of elasticity of the burnishing member used in the first operation.
Figure 9:
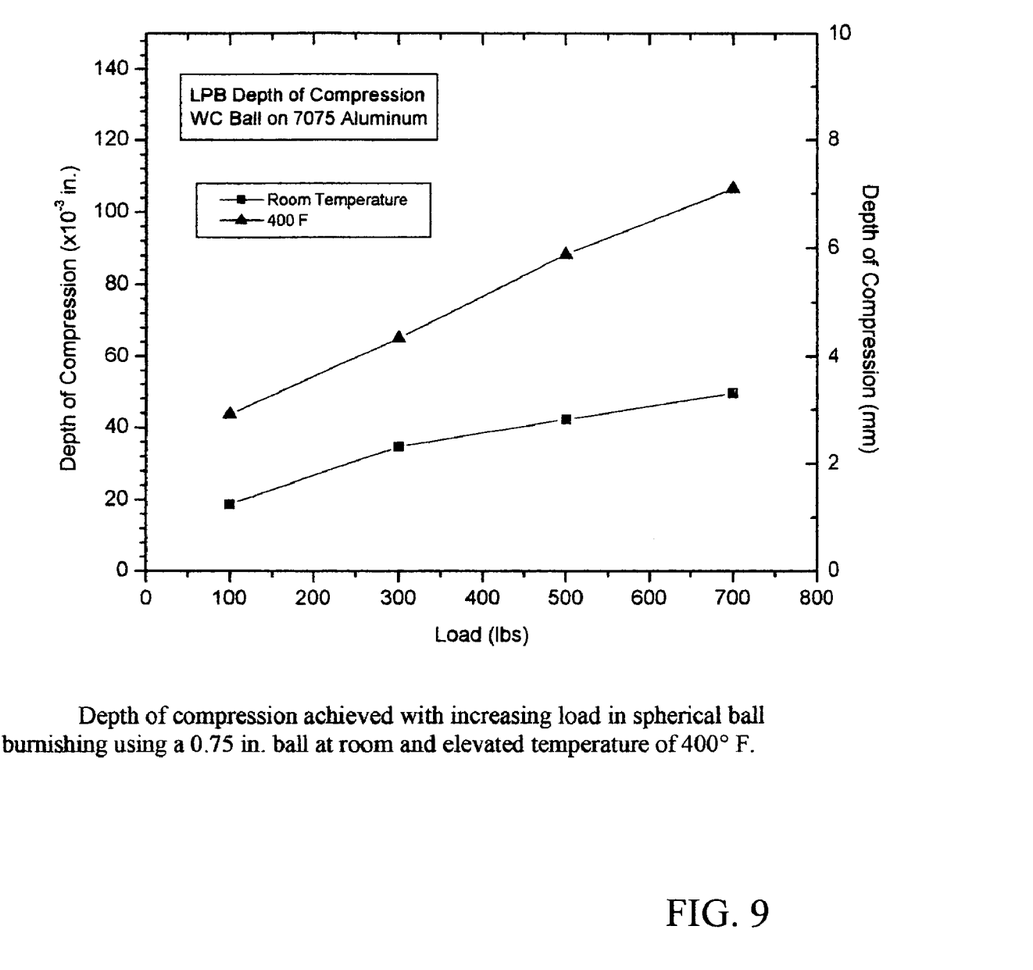
FIG. 9 is a graph illustrating that a greater depth of compression can be achieved with increase loading in spherical ball burnishing (using a 0.75 in (1.9 cm) ball) at an elevated temperature of 400° F. (204° C.) as compared to the same process at room temperature.
Figure 10:
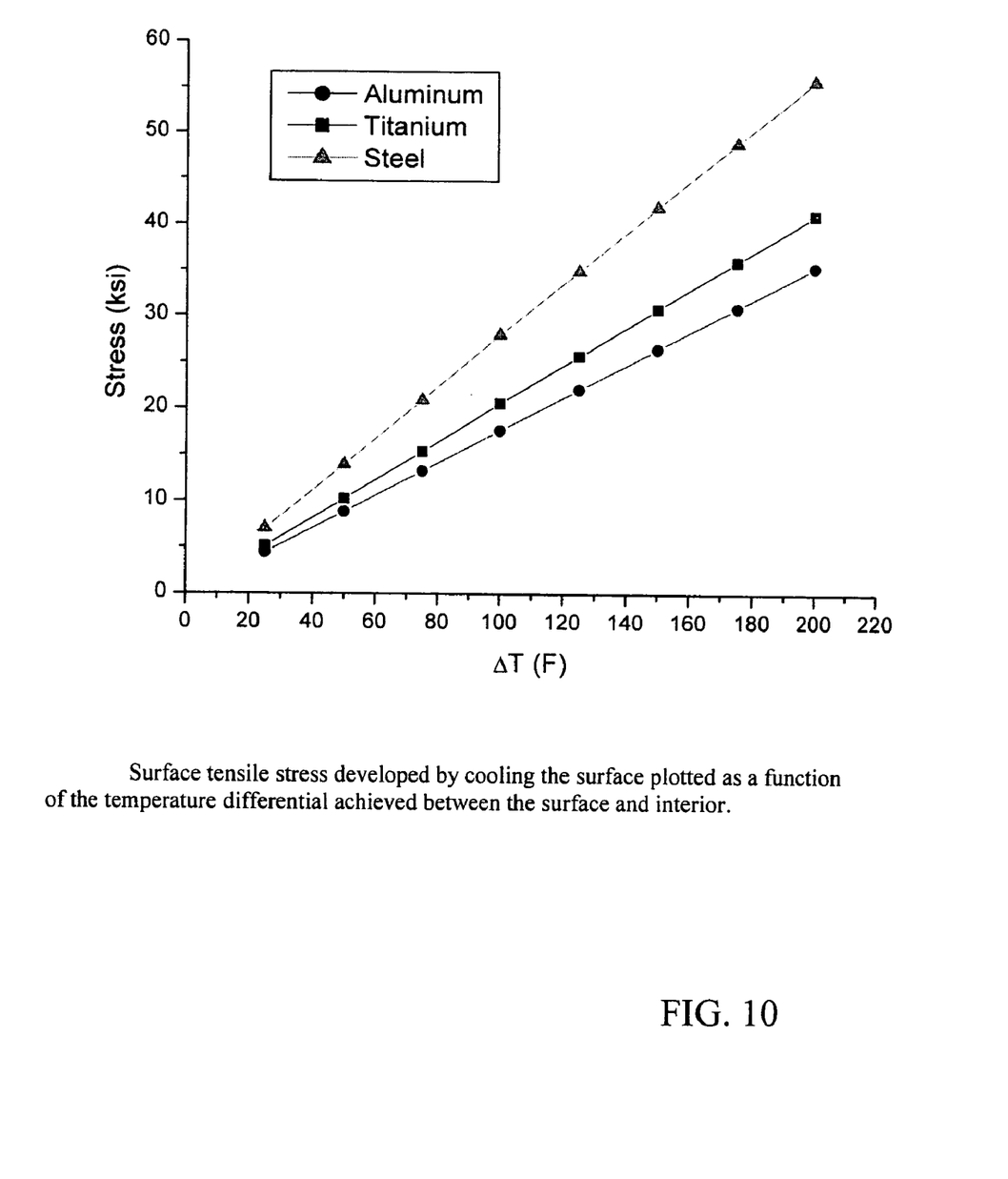
FIG. 10 is a graph illustrating that an increase in surface tensile stress can be obtained by cooling the surface of the part (plotted as a function of the temperature differential between the surface and the interior of the part).

Referring to FIG. 8, a graphical representation illustrating the subsurface residual stress distributions produced by conventional burnishing and by the method of the present invention is shown whereby conventional burnishing was performed for inducing compressive residual stress in the surface of the part using a 0.25 in. (0.635 cm) diameter ball burnishing member in a single pass and the method of the present application by performing a first operation using a 0.25 in. (0.635 cm) diameter burnishing member and a second operation using a 0.25 in. (0.64 cm) diameter ball burnishing member whereby the modulus of elasticity of the burnishing member used in the second operation is greater than the modulus of elasticity of the burnishing member used in the first operation. As can be seen, the residual stress distributions as a function of depth shows the increased compression achieved to a depth of less than about one millimeter due to the use of the second pass burnishing operation.

It has also been found that by inducing a layer of compressive residual stress in the surface of a part, such as by burnishing, along regions having elevated temperature produces residual stresses that are more stable when subjected to elevated temperature. Such stability is believed to be attributed to strain aging which occurs during the warm deformation process that leads to more diffuse dislocation structures and pinning of dislocations by solute atoms and/or precipitates. It has also been found that by performing the compression operation with the surface of the part heated to an elevated temperature, rather than at room temperature, produces a deeper compressive residual stress layer. Because of the reduction of the part yield strength, plastic deformation extends to a greater depth thereby producing deeper compression, as well as deeper penetration of the burnishing tool, thereby producing more lateral flow of surface material and higher surface compression. Accordingly, the method of inducing a compressive residual stress along the surface of a part may include the step of heating and/or cooling the surface prior to performing the first operation and/or prior to performing the second operation, step 214. As illustrated in FIG. 8, the depth of compression, calculated using conventional finite element methods and published yield strengths, achieved by burnishing a material, such as 7075-T6 aluminum, at a heated temperature, such as 400° F. (204° C.), is over twice the depth of compression achieved by burnishing at room temperature. The depth of compression achieved increases with the increasing burnishing load. It should now be apparent to those skilled in the art that by performing a first operation at a first temperature and then a second operation at a second temperature can induce multiple layers of residual compressive stress or that various patterns of compressive residual stress can be induced along the surface of a part. Further, by performing the method of the present application using various combinations of burnishing members having different diameters and/or different modulus of elasticity, burnishing patterns, and surface temperatures, numerous compressive residual stress patterns and layers can be induced within the surface of a part. It should also now be apparent to those skilled in the art that parts can now be manufactured or treated having optimum compressive residual stress patterns that will improve fatigue life and reduce susceptibility to corrosion-fatigue and stress corrosion cracking. Further, by performing X-ray diffraction the optimum compressive stress pattern obtainable can be determined.

Accordingly, the method and the apparatus of the present invention is a relatively inexpensive and effective means of inducing a desired layer of compressive residual stress in the surface of a part for providing the optimum fatigue life for reducing susceptibility to corrosion-fatigue and stress corrosion cracking.

What is claimed is:

1. A method of inducing residual compressive stresses in the surface of a part comprising the steps of:
   selecting at least one region along the surface of the part for inducing a first layer of compressive stresses within the surface of the part;
   performing a first burnishing operation using a first burnishing member to induce a first layer of compressive surface stresses along a selected region of the part; and
   performing a second burnishing operation using a second burnishing member to induce a second layer of compressive surfaces stresses along a selected region of the part;
   wherein said first burnishing member has a first diameter and said second burnishing member having a second different diameter.

2. The method of claim 1 wherein the modulus of elasticity of the burnishing member performing the first burnishing operation is different than the modulus of elasticity performing the second burnishing operation.

3. The method of claim 1 wherein the temperature of the surface of the part during the first burnishing operation is of a first temperature and the temperature of the surface of the part during the second burnishing operation is of a second different temperature.

4. A method of inducing residual compressive stresses in the surface of a part comprising the steps of:
   selecting at least one region along the surface of the part for inducing a first layer of compressive stresses within the surface of the part;
   performing a first burnishing operation using a first burnishing member to induce a first layer of compressive surface stresses along a selected region of the part; and
   performing a second burnishing operation using a second burnishing member to induce a second layer of compressive surfaces stresses along a selected region of the part;
   wherein the first burnishing operation is performed when the temperature of the surface is at a first temperature and the second burnishing operation is performed when the temperature of the surface is at a temperature different than the first temperature.

5. A method of inducing residual compressive stresses in the surface of a part comprising the steps of:
   selecting at least one region along the surface of the part for inducing a first layer of compressive stresses within the surface of the part;
   performing a first burnishing operation using a first burnishing member to induce a first layer of compressive surface stresses along a selected region of the part; and
   performing a second burnishing operation using a second burnishing member to induce a second layer of compressive surfaces stresses along a selected region of the part;
   wherein said first burnishing member has a modulus of elasticity that is different than the modulus of elasticity of said second burnishing member.

6. The method of claim 5 wherein the temperature of the surface of the part during the first burnishing operation is of a first temperature and the temperature of the surface of the part during the second burnishing operation is of a second different temperature.

\* \* \* \* \*